(12) United States Patent
Tsuchida et al.

(10) Patent No.: US 7,028,662 B2
(45) Date of Patent: Apr. 18, 2006

(54) DIRECT FUEL INJECTION ENGINE

(75) Inventors: Hirofumi Tsuchida, Yokosuka (JP); Koji Hiraya, Yokohama (JP); Isamu Hotta, Yokohama (JP); Taisuke Shiraishi, Yokohama (JP); Toshikazu Shiino, Chigasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/969,339

(22) Filed: Oct. 21, 2004

(65) Prior Publication Data

US 2005/0098145 A1    May 12, 2005

(30) Foreign Application Priority Data

Nov. 6, 2003  (JP)  ............................. 2003-376575
Nov. 6, 2003  (JP)  ............................. 2003-377166

(51) Int. Cl.
*F02B 19/08*    (2006.01)

(52) U.S. Cl. ...................................... 123/276; 123/301

(58) Field of Classification Search ................. 123/276, 123/279, 295, 298, 301, 305, 661
See application file for complete search history.

(56) References Cited

U.S. PATENT DOCUMENTS

| 4,920,937 | A | * | 5/1990 | Sasaki et al. | ................ | 123/276 |
| 5,140,958 | A | * | 8/1992 | Kobayashi et al. | ......... | 123/276 |
| 6,129,070 | A | * | 10/2000 | Jingu et al. | ................ | 123/276 |
| 6,892,693 | B1 | * | 5/2005 | Montgomery et al. | ...... | 123/276 |

FOREIGN PATENT DOCUMENTS

JP    2000-265841 A    9/2000

* cited by examiner

*Primary Examiner*—Willis R. Wolfe, Jr.
(74) *Attorney, Agent, or Firm*—Shinjyu Global IP Counselors

(57) ABSTRACT

A direct fuel injection engine is provided that an appropriate stratified fuel-air mixture is formed to conduct good stratified combustion over a wide range of loads. The engine has a fuel injection valve that is arranged at an upper surface of the combustion chamber on or near the center reciprocation axis of the piston and oriented such that the injection center axis of the fuel stream injected therefrom is slanted with respect to the center reciprocation axis of the piston. The piston is disposed in the combustion chamber to move along a cylinder center axis. The piston has a top surface having a first outer cavity having a first cavity center axis, and a second inner cavity located in the outer cavity. The second inner cavity has a second cavity center axis offset from the cylinder center axis of the piston in a direction perpendicular to the cylinder center axis.

15 Claims, 11 Drawing Sheets

DIRECT FUEL INJECTION ENGINE

BACKGROUND OF THE INVENTION

1. Field of the Invention

The present invention generally relates to a direct fuel injection engine in which a fuel is directly injected in a combustion chamber and ignited by a spark plug. More specifically, the present invention relates to a direct fuel injection engine that has a piston with a pair of cavities that are arranged to receive the injected fuel at an angle relative to the piston axis for obtaining an excellent stratified fuel-air mixture.

2. Background Information

Fuel consumption of an internal combustion engine can be greatly reduced, particularly in low to medium load regions, when the internal combustion engine is configured to inject fuel directly into the combustion chamber from a fuel injection valve and very lean combustion is conducted by forming a stratified fuel-air mixture inside the cylinder. In order for this kind of direction fuel injection engine to ignite and combust the fuel-air mixture in a stable and reliable manner, it is important to form a well-stratified fuel-air mixture agglomeration inside the cylinder such that the size and air-fuel ratio of the fuel-air mixture agglomeration is appropriate for the rotational speed and load of the engine.

With this kind of direction fuel injection engine, one known method of forming an optimum fuel-air mixture over a wide range of operating conditions is to provide a fuel injection valve oriented generally parallel to the center reciprocation axis of the piston and arranged near the center of an upper area of the combustion chamber and injecting fuel toward a cavity provided in the top surface of the piston so as to form a stratified fuel-air mixture. An example of a direct fuel injection internal combustion engine that employs a center injection arrangement in which a fuel injection valve and spark plug are arranged on or near the reciprocation axis of the piston is disclosed in Japanese Laid-Open Patent Publication No. 2000-265841.

In this publication, the fuel injection valve and spark plug are arranged on or near an upper area of the combustion chamber that is adjacent the center reciprocation axis of the piston. In this publication, the shape of a fuel streams injected from the fuel injection valve form a hollow cone that strikes the top surface of the piston. The top surface of the piston is provided with a cavity comprising a central deep dish or cavity and a plurality of shallow dishes or cavities that are arranged around the perimeter of the deep dish or cavity. By varying the injection timing in accordance with the operating conditions, the forming state of the stratified fuel-air mixture can be changed and stratified operation can be accomplished over a wide range of operating conditions. More specifically, the fuel stream can also be injected to either the deep cavity or the shallow cavities by varying the fuel injection timing, thereby enabling the stratified state of the fuel stream to be changed (i.e., switched between stratified combustion and weakly stratified combustion). When operating in a region of low to medium speed, the fuel injection timing is controlled to occur during a latter half of the compression stroke such that the fuel stream hits the deep cavity. When the fuel stream hits the deep cavity, a high stratified state is obtained in which an agglomerate fuel-air mixture forms inside the deep cavity and there above. When operating in a region of high speed, the fuel injection timing is controlled to occur during a former half of the compression stroke such that the fuel stream hits the shallow cavities. When the fuel stream hits the shallow cavities, the fuel stream is guided by lateral wall surfaces of the shallow cavities such that it swirls upward. As a result, a low stratified state is obtained in which a fuel-air mixture agglomeration is formed inside the shallow cavities and there above. Thus, combustion can be accomplished with good fuel efficiency.

In view of the above, it will be apparent to those skilled in the art from this disclosure that there exists a need for an improved direct fuel injection engine. This invention addresses this need in the art as well as other needs, which will become apparent to those skilled in the art from this disclosure.

SUMMARY OF THE INVENTION

It has been discovered that when the fuel injection valve is arranged at or near the center of the combustion chamber, it is sometimes difficult to orient the fuel injection valve such that it is parallel with the center reciprocation axis of the piston, i.e., such that the fuel injection valve is perpendicular to the top surface of the piston. In particular, it has been discovered that sometimes the fuel injection valve is mounted such that it is somewhat slanted with respect to the center reciprocation axis of the piston. In such cases, depending on the fuel injection timing, the fuel stream sometimes spills out of the cavity because the direction of the fuel stream leaving the fuel injection valve is also slanted with respect to the center reciprocation axis. This spillage of the fuel stream from the deep cavity causes the stratification of the fuel-air mixture to deteriorate, the stability of the combustion to degrade, and unburned hydrocarbons to be exhausted from the engine. Additionally, when the fuel stream spills out of the shallow recesses provided around the outside perimeter of the deep cavity, there is the risk that the fuel stream will reach the cylinder wall and cause hydrocarbon emission to increase.

Moreover, it has been discovered from the internal combustion engine described in the publication mentioned above, that when the fuel injection valve is arranged in such a manner as to be slanted with respect to the center axis of the cylinder and, so long as the fuel injection valve does not have a special structure that causes the direction of the fuel stream to deviate from the center axis of the fuel injection valve, the fuel stream will not be axially symmetrical with respect to the center axis of the cylinder. Instead, the fuel stream will be unevenly distributed around the center axis of the cylinder. Since the unevenness of the fuel stream distribution around the center axis increases as the fuel stream disperses, the degree of dispersion of a fuel stream striking the deep cavity is different from the degree of dispersion of a fuel stream striking the shallow dish cavities because the fuel injection timing of the respective fuel streams is different. Consequently, the positioning of the deep cavity with respect to the fuel injection valve needs to be different than the positioning of the shallow cavities with respect to the fuel injection valve.

The publication mentioned above makes no stipulations regarding the positioning of the fuel injection valve (i.e., the slant of the fuel injection valve) with respect to the deep cavity and the shallow cavities and, thus, there room for improvement regarding this matter. More specifically, in an engine in which the piston is provided with a plurality of cavities (such as a deep cavity and shallow cavities) that are used with fuel streams of different degrees of dispersion, it is necessary to strictly regulate the positioning of the fuel injection valve (i.e., the slant of the fuel injection valve) with respect to each cavity in order to accomplish stable stratified combustion over a wide range of loads.

The present invention was conceived in view of the problems described above. One object of the present invention is to provide an arrangement whereby an appropriate stratified fuel-air mixture can be formed in an internal combustion engine having a fuel injection valve that is arranged at or near the center of an upper area of the combustion chamber of the piston and that injects a fuel stream toward a cavity provided in the top surface of the piston in a direction that is slanted with respect the center reciprocation axis of the piston.

Another object of the present invention is to provide a direct fuel injection engine in which the fuel injection valve (injector) is slanted with respect to the center axis of the cylinder such that the engine can perform stable stratified combustion over a wide range of loads.

Accordingly, in order to achieve the above objects, a direct fuel injection engine is provided that basically comprises a combustion chamber, a piston, a spark plug and a fuel injection valve. The piston is disposed in the combustion chamber to move along a cylinder center axis. The piston includes a top surface having a first outer cavity having a first cavity center axis, and a second inner cavity located in the outer cavity and having a second cavity center axis offset from the cylinder center axis of the piston in a direction perpendicular to the cylinder center axis. The spark plug has a tip arranged in an upper area of the combustion chamber to ignite a fuel-air mixture inside the combustion chamber. The fuel injection valve is arranged in the upper area of the combustion chamber to inject a fuel stream directly into the combustion chamber towards the outer and inner cavities in the top surface of the piston. The fuel stream has an injection center axis that is slanted relative to the cylinder center axis.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
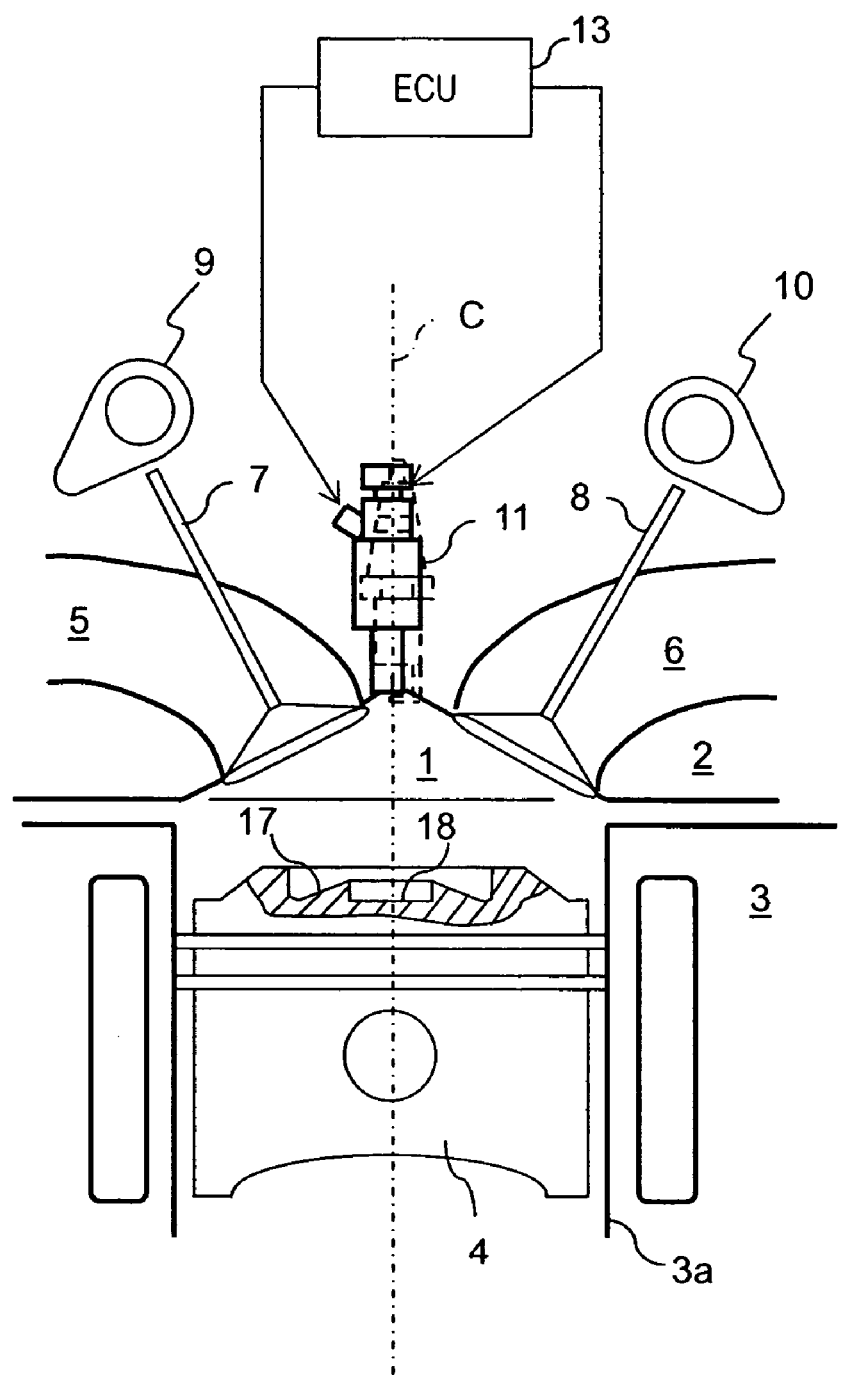
FIG. 1 is a schematic partial cross sectional view of an injection portion of a combustion chamber of a direct fuel injection engine in accordance with a first embodiment of the present invention as viewed in a direction parallel to the piston pin.
Figure 2:
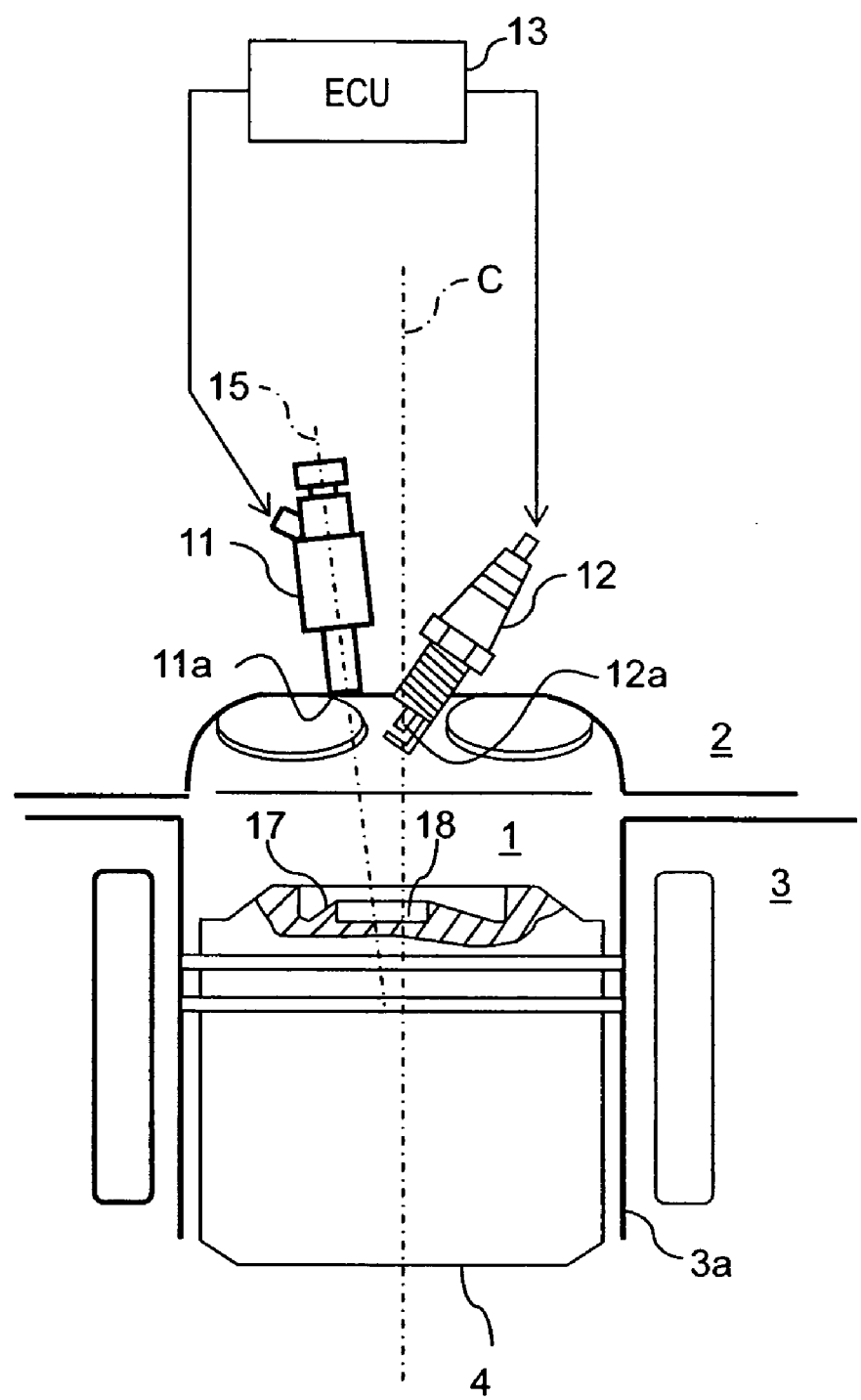
FIG. 2 is a partial cross sectional view of an injection portion of a combustion chamber of a direct fuel injection engine in accordance with the first embodiment of the present invention as viewed in a direction perpendicular to the piston pin.

Referring initially to FIGS. 1 and 2, a direct fuel injection internal combustion engine (hereinafter "direct fuel injection engine") is schematically illustrated in accordance with a first embodiment of the present invention. The direct fuel injection engine is a spark ignition internal combustion engine with direct fuel injection. FIGS. 1 and 2 are schematic partial cross-sectional views of an injection portion of the direct fuel injection engine of the first embodiment. As seen in FIGS. 1 and 2, the injection portion of the direct fuel injection engine includes a combustion chamber 1, a cylinder head 2, a cylinder block 3 with a cylinder 3a, a piston 4, a pair of intake ports 5, a pair of exhaust ports 6, a pair of intake valves 7, a pair of exhaust valves 8, an intake cam 9, an exhaust cam 10, a fuel injection valve or injector 11, a spark plug 12, and an engine control unit 13.

The combustion chamber 1 is basically defined by the cylinder head 2, the cylinder block 3 and the piston 4. The intake ports 5 and the exhaust ports 6 are provided in the cylinder head 2, and open into the combustion chamber 1. New or fresh air is introduced into the combustion chamber 1 from the intake ports 5 via the intake valves 7, while exhaust gas is exhausted from the exhaust ports 6 via the exhaust valve 7. The intake valve 7 and the exhaust valve 8 are provided for opening and closing the ports 5 and 6 and are driven by the intake cam 9 and the exhaust cam 10. Moreover, a variably valve timing mechanism is preferably used to control a valve timing of the intake cam. Variably valve timing mechanism are well known in the art, and thus, the variably valve timing mechanism will not be discussed or illustrated in detail herein.

The fuel injection valve 11 is configured and arranged in the cylinder head 2 to inject fuel directly into the combustion chamber 1 toward the top surface of the piston 4. The spark plug 12 is configured and arranged in the cylinder head 2 to spark ignite a fuel-air mixture inside the combustion chamber 1. The fuel injection valve 11 and the spark plug 12 are both arranged close to the cylinder center axis C in such a manner as to face into the combustion chamber 1 from an upper area of the combustion chamber 1. The cylinder center axis C is also coincident with the center reciprocation axis of the piston 4. The fuel injection valve 11 is preferably a multi-hole injector with strong directionality in order to keep the change in the shape of the fuel stream small, particularly during the latter half of the compression stroke when the cylinder pressure is increasing.

The engine control unit (ECU) 13 controls the operation of the fuel injection valve 11 and the spark plug 12. In other words, the fuel injection valve 11 and the spark plug 12 are operatively coupled to the engine control unit 13 such that the operations of the fuel injection valve 11 and the spark plug 12 are controlled by the engine control unit 13. The engine control unit 13 preferably includes a microcomputer with a direct fuel injection control program that controls at least one of frequency and start timing of fuel injection based on an engine operating condition as discussed in more detail below. More specifically, the engine control unit 13 is configured to receive signals indicative of at least an engine load and the rotational speed to determine the engine operating condition. The engine control unit 13 can also include other conventional components such as an input interface circuit, an output interface circuit, and storage devices such as a ROM (Read Only Memory) device and a RAM (Random Access Memory) device. The internal RAM of the engine control unit 13 stores statuses of operational flags and various control data. It will be apparent to those skilled in the art from this disclosure that the precise structure and algorithms for the engine control unit 13 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. The engine control unit 13 is a conventional component that is well known in the art. Since engine control units are well known in the art, the particulars of the engine control unit 13 will not be discussed or illustrated in detail herein.

As explained below, with a direct fuel injection internal combustion engine in accordance with the present invention, stratified combustion with good fuel efficiency can be accomplished with both the outer and inner cavities 17 and 18 even though the injector or fuel injection valve 11 is arranged to inject fuel in a direction that is slanted with respect to the cylinder center axis C because the first or outer cavity 17 is provided in such a position that its cavity center axis is coincident or nearly coincident with the cylinder center axis C and the second or inner cavity 18 is provided in such a position as to compensate for fact that the fuel injection direction is slanted with respect to the cylinder center axis C.

The outer cavity 17 and the inner cavity 18 are arranged to be substantially rotationally symmetrical (axially symmetrical or toroidal) with respect to their center axes. As used herein, the phrase "substantially axially symmetrical" should be interpreted to include minor variations in the surface that do not alter the objectives of the present invention. Thus, the phrase "substantially axially symmetrical" includes a slightly flattened circle, or shapes in which a portion of the surface has been removed.

The first or outer cavity 17 is used with respect to a spread-out fuel stream injected when the piston 4 is in a low position during the compression stroke and serves to produce a comparatively large stratified fuel-air mixture (during high-load operation). By positioning the first or outer cavity 17 in the approximate center of the combustion chamber, the stratified combustion is conducted at a position that is distant from the wall surface such that cooling losses are small and the fuel efficiency is good. Meanwhile, the second or inner cavity 18 is used with respect to a compact (less spread out) fuel stream injected when the piston is in a position near the top dead center of the compression stroke and serves to produce a comparatively small and strong stratified fuel-air mixture (during low-load operation). By offsetting the second or inner cavity 18 from the center of the combustion chamber to accommodate the slanted state of the fuel stream (injection center axis), the fuel stream is reliably kept within the second cavity and the generation of unburned hydrocarbons is reduced (fuel efficient stratified combustion is also achieved). Thus, stratified combustion that is fuel efficient and stable can be conducted over a wide range of loads ranging from high loads to low loads.

As shown in FIG. 2, the position of the injection point 11a on the tip of the fuel injection valve 11 is offset from the cylinder center axis C toward the front of the engine. Also, the fuel injection valve 11 as a whole is mounted along an injector mounting axis 15 that is tilted toward the front of the engine from the cylinder center axis C. The injector mounting axis 15 also coincides with the injection center axis. Thus, the same reference numeral will be used to refer to both the injector mounting axis and the injection center axis. Therefore, the injection center axis 15 of the fuel stream injected from the fuel injection valve 11 is also slanted with respect to the cylinder center axis C. Although in this embodiment the injection point 11a of the fuel injection valve 11 is offset toward the front of the engine and the injector mounting axis 15 is slanted toward the front of the vehicle, it is also acceptable to use different offset and slant directions, such as toward the rear of the engine or toward the intake port or exhaust port.

The spark point (spark discharge gap) at the tip of the spark plug 12 is positioned on the cylinder center axis C and the spark plug 12 as a whole is slanted in the opposite direction as the fuel injection valve 11 with respect to the cylinder center axis C.

Figure 3:
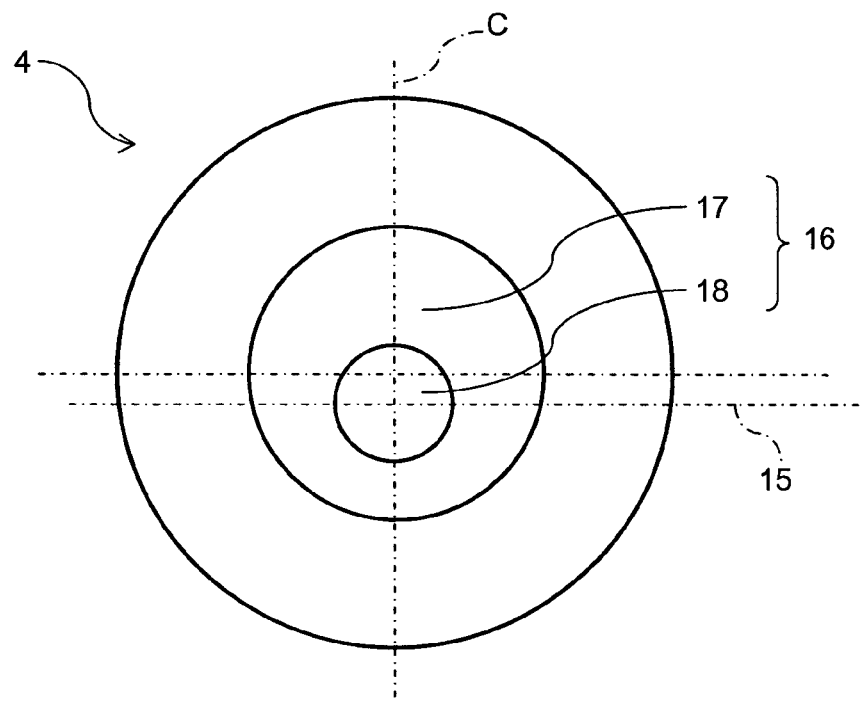
FIG. 3 is a top plan view of the piston illustrating the arrangement of the piston cavities in accordance with the first embodiment of the present invention.

FIG. 2 shows the shape of the piston 4. As shown in FIG. 3, the top surface of the piston 4 is provided with a generally circular cavity 16 when viewed from above. The cavity 16 has a dual structure comprising a larger diameter outer cavity 17 ("first cavity") and a smaller diameter inner cavity 18 ("second cavity"). Each cavity has a cavity center axis that extends parallel to the center reciprocation axis of the piston 4 (i.e., the cylinder center axis C) and intersects the top surface of the piston at a cavity center point. The first cavity center axis of the outer cavity 17 and the second cavity center axis of the inner cavity 18 are not coincident. Instead, these axes are offset from each other by a prescribed distance in a prescribed direction.

More specifically, the outer cavity 17 is formed such that the cavity center point thereof lies on or near the cylinder center axis C and the inner cavity 18 is formed such that that the cavity center point thereof is positioned on the injector mounting axis 15 when the piston 4 is near top dead center. In other words, as seen in FIGS. 2, 3 and 5, the cavity center axis of the inner cavity 18 is offset toward the fuel injection valve 11 from the cavity center axis of the outer cavity 17 (i.e., from the cylinder center axis C).

Figure 4:
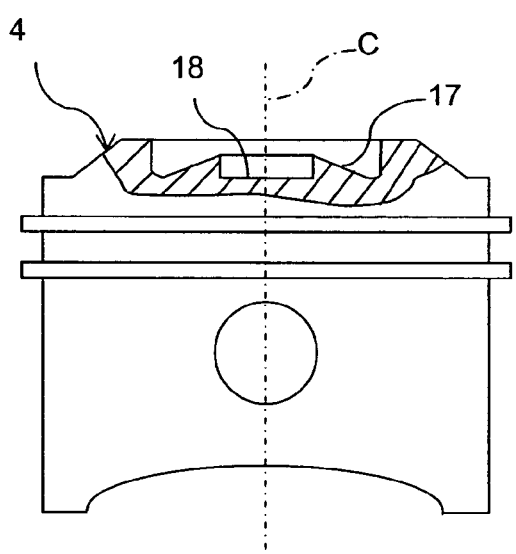
FIG. 4 is a side elevational view of the piston shown in FIGS. 1–3 as viewed in a direction parallel to the piston pin and with an upper portion broken away to illustrate the cavities in the top surface of the piston in accordance with the first embodiment of the present invention.
Figure 5:
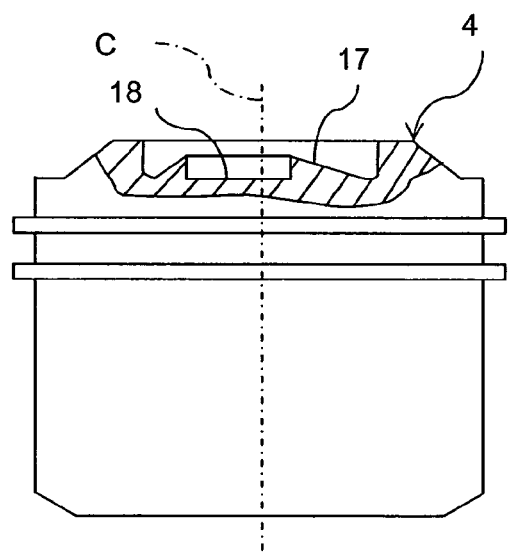
FIG. 5 is a side elevational view of the piston shown in FIGS. 1–4 as viewed in a direction perpendicular to the piston pin and with an upper portion broken away to illustrate the cavities in the top surface of the piston in accordance with the first embodiment of the present invention.

As shown in FIGS. 4 and 5, the bottom surface of the outer cavity 17, i.e., the surface of the section between the peripheral wall of the outer cavity 17 and the peripheral wall of the inner cavity 18, is slanted downward toward the outside. Thus, the depth of the outer cavity 17 increases as one moves from the perimeter of the inner cavity 18 toward the perimeter of the outer cavity 17. The bottom surface of the inner cavity 18 is substantially perpendicular to the cylinder center axis C. Instead of making the entire bottom surface of the outer cavity 17 slanted, it is also acceptable for only a portion of the bottom surface of the outer cavity 17 to be slanted and the remainder to lie in a plane substantially perpendicular to the cylinder center axis C.

The fuel injection valve 11 is controlled by the engine control unit 13 such that the fuel injection valve 11 injects fuel toward the outer cavity 17 when the engine is operating under a comparatively high load in the stratified operating region and toward the inner cavity 18 when the engine is operating under a comparatively low load in the stratified operating region. The behaviors of the fuel stream and the fuel-air mixture in this embodiment will now be described.

FIG. 3 shows the behavior of the fuel stream and fuel-air mixture under high-load stratified operating conditions. Under high-load stratified operating conditions, the engine control unit 13 controls the fuel injection timing of the fuel injection valve 111 such that the fuel is injected when the piston 4 is at a comparatively low position in the compression stroke, as shown in diagram (a) of FIG. 6. The fuel streams first strike the bottom surface of the outer cavity 17 and then spread outwardly. Since the bottom surface of the outer cavity 17 is slanted as described above, the fuel streams move readily toward the peripheral wall of the outer cavity 17. After the fuel streams have moved along the bottom surface to the peripheral wall, the fuel streams rise upward following the contour of the peripheral wall, as shown in diagram (b) of FIG. 6.

Figure 6:
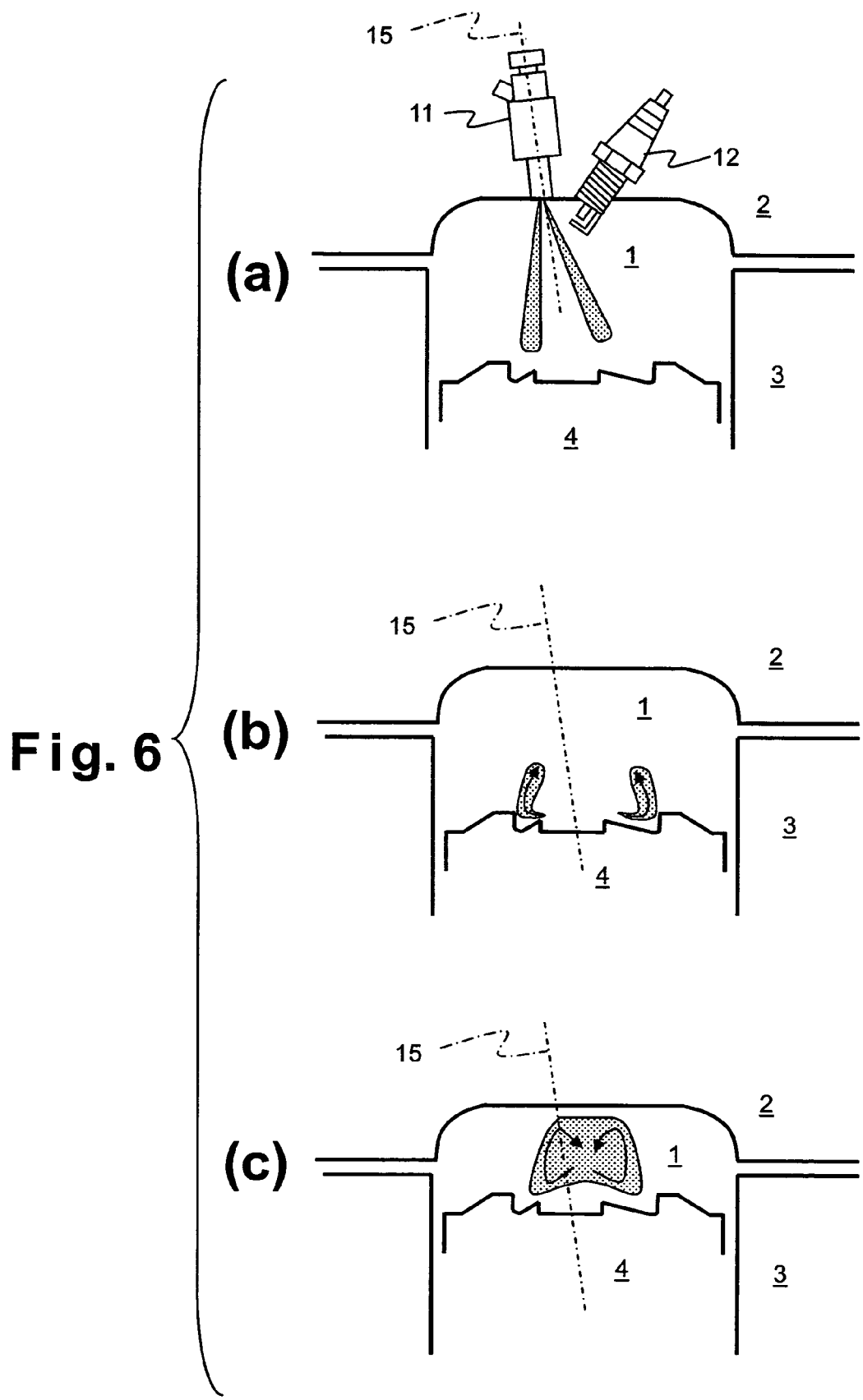
FIG. 6 is a series of diagrammatic side elevational views of the combustion chamber as viewed in a direction parallel to the piston pin to illustrate a case in which a stratified fuel-air mixture is formed inside the outer cavity in accordance with the first embodiment of the present invention.

Since the penetration of the fuel streams injected from the fuel injection valve 11 are strong, the flow of the fuel streams cause the entire fuel-air mixture to have a circulating flow that rotates in a swirl-like manner in the space between the piston 4 and the bottom surface of the cylinder head 2, as shown in diagram (c) of FIG. 6. This rotating flow pulls in air from the surrounding areas causes a stratified fuel-air mixture agglomeration that is large and homogeneous (i.e., has few concentration variations) to form above the cavity 16.

Although it is omitted from the figures, it is also possible to execute a second fuel injection toward the inner cavity 18 when the piston is near top dead center, thereby forming a homogeneous fuel-air mixture in the inner cavity 18 as well as the outer cavity 17 so that a homogeneous stratified fuel-air mixture is generated in the entire cavity 16.

Since the outer cavity 17 is arranged such that the cavity center point thereof is positioned on the cylinder center axis C, i.e., at the center of the combustion chamber, the flame produced during the combustion period is separated from the wall surfaces of the combustion chamber and stratified combustion with few cooling losses can be accomplished. Since the spark plug 12 is arranged such that the spark discharge gap 12a is positioned on the cylinder center axis C, the combustion can be started from the center of the combustion chamber (i.e., the center of the stratified fuel-air mixture) when a comparatively large stratified fuel-air mixture is formed at the center of the combustion chamber using the outer cavity 17.

Figure 7:
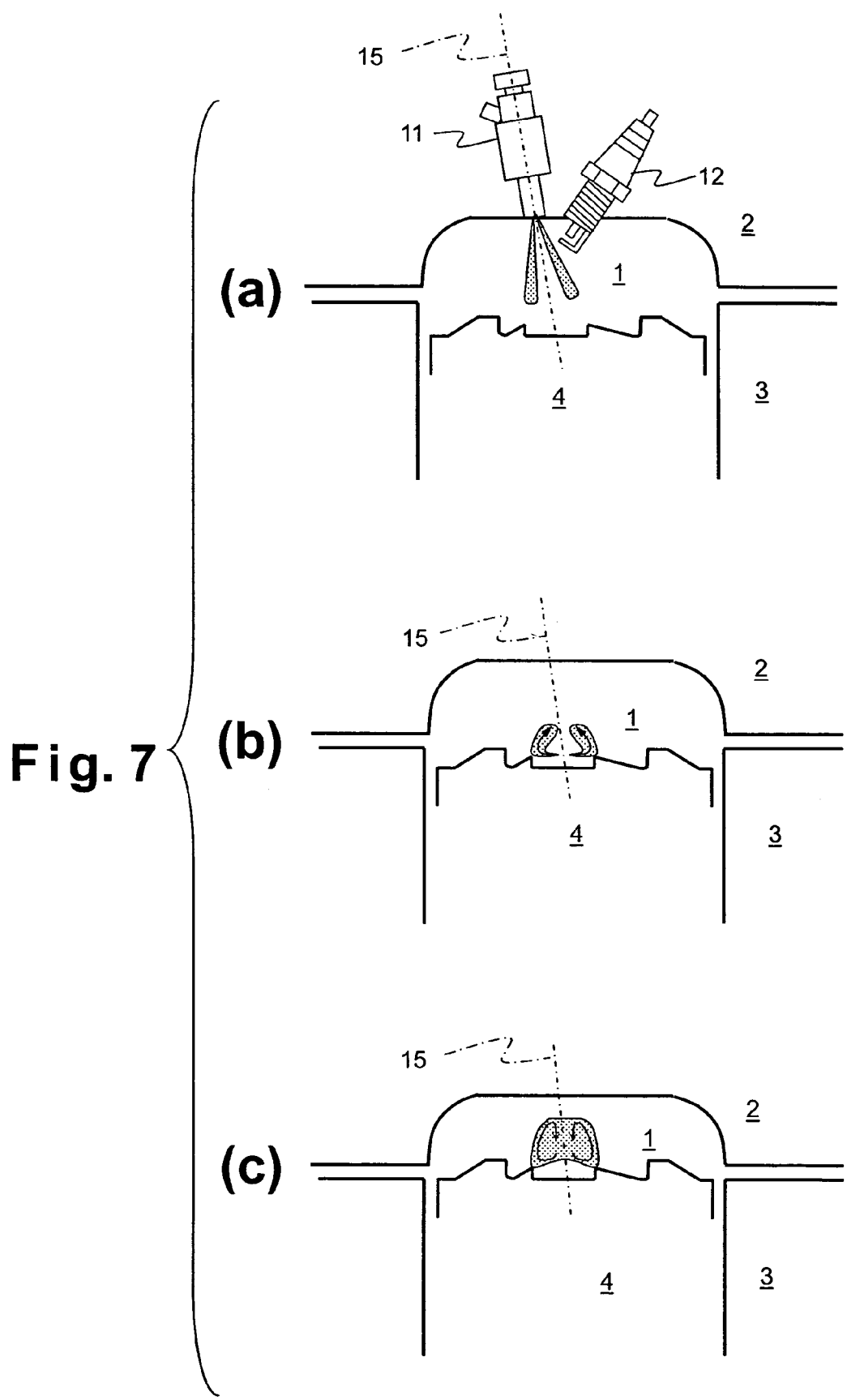
FIG. 7 is a series of diagrammatic side elevational views of the combustion chamber as viewed in a direction parallel to the piston pin to illustrate a case in which a stratified fuel-air mixture is formed inside the inner cavity in accordance with the first embodiment of the present invention.

FIG. 7 shows the behavior the fuel stream and fuel-air mixture under low-load stratified operating conditions. The process of forming the fuel-air mixture under low-load stratified operating conditions is basically the same as it is under high-load stratified operating conditions except that the inner cavity 18 is used. That is, the engine control unit 13 controls the fuel injection timing of the fuel injection valve 11 such that the fuel is injected when the piston 4 is at a high position (near top dead center) in the compression stroke, as shown in diagram (a) of FIG. 7. The fuel stream first strikes the bottom surface of the inner cavity 17. As seen in diagrams (b) and (c) of FIG. 7, the fuel stream moves along the bottom surface and the peripheral wall of the inner cavity 18, and similarly to the case of high-load stratified operating conditions, a small homogeneous stratified fuel-air mixture having a circulating flow is formed above the cavity 16.

Since the inner cavity 18 is arranged such that its cavity center point is positioned on the injector mounting axis 15 when the piston 4 is positioned near top dead center, spillage of the fuel stream caused by the slanted orientation of the fuel injection valve 11 is prevented in an effective manner.

Figure 8:
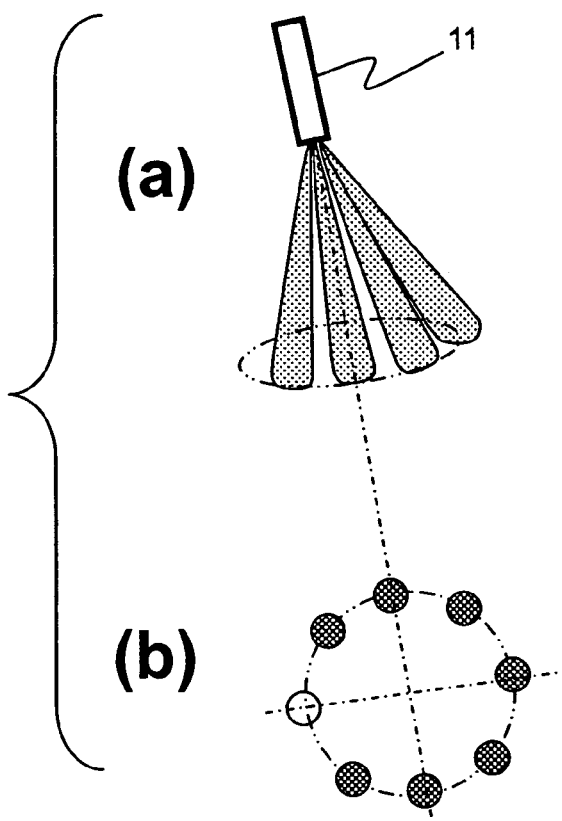
FIG. 8 is a pair diagrammatic illustrations showing the fuel injection stream of a preferred injector that is used in accordance with the first embodiment of the present invention.

FIG. 8 illustrates the generally cone shape fuel stream that is preferably injected from the fuel injection valve 11 in the preferred version of this embodiment. As mentioned above, the fuel injection valve 11 is a multi-hole type injector. The fuel injection valve 11 is the same as the normal multi-hole injector shown in FIG. 9, except that the injection vent (hole) positioned the lowest when the injector is installed in a slanted orientation has been eliminated.

Since the cavity center axis of the inner cavity 18 is offset toward the fuel injection valve 11 from the cavity center axis of the outer cavity 17, the bottom surface of the outer cavity 17 on that side is narrow and steeply sloped, making it difficult to form a circulating flow utilizing the flow motion of the fuel stream. Therefore, fuel is not injected from the bottommost fuel injection vent. In other words, fuel is not injected to a prescribed region centered on the portion of the cavity 16 where the distance from the peripheral wall of the outer cavity 17 to the inner cavity 18 is the shortest (see diagram (b) of FIG. 8). As a result, when the outer cavity 17 is used, the formation of a heterogeneous fuel-air mixture is suppressed or prevented, and spillage of the fuel stream from the cavity is prevented. Thus, this arrangement prevents increased unburned hydrocarbons and prevents degraded performance with respect to EGR.

Although in this embodiment, only the fuel injection vent at the lowest position is eliminated, the fuel injection vents to be eliminated should be determined as appropriate depending on the design conditions (i.e., it is acceptable to eliminate only one or to eliminate more than one).

With this embodiment, the injection point 11a at the tip of the fuel injection valve 11 is positioned so as to be offset from the cylinder center axis C and the fuel injection valve 11 is mounted along an injector mounting axis 15 that is slanted with respect to the cylinder center axis C.

Furthermore, the inner cavity (second cavity) 18 is arranged such that its cavity center axis is offset toward the injector 11 from the cylinder center axis C. As a result, even when the fuel injection valve 11 cannot be installed on the cylinder center axis C due to design constraints, the inner cavity 18 can be provided in a manner that accommodates a slanted fuel injection direction (injection center axis) and spillage of the fuel stream and the generation of unburned hydrocarbons can be suppressed or prevented.

With this embodiment, the cavity center point of the inner cavity (second cavity) 18 is positioned on the injector mounting axis 15 when the piston 4 is near top dead center. Therefore, when the inner cavity 18 is used, the fuel stream can be contained more effectively inside the inner cavity 18 and the generation of unburned hydrocarbons can be reduced.

Meanwhile, with this embodiment, the fuel injection valve 11 is the same as a normal multi-hole injector except that the hole positioned lowest when the injector is mounted in a slanted mariner has been eliminated, thereby preventing fuel from being injected to the location where the distance from the peripheral wall of the outer cavity 17 (first cavity) to the inner cavity 18 (second cavity) is the shortest (see FIG. 8), i.e., preventing fuel from being injected to a portion where it is difficult for a circulating flow to develop. As a result, when the outer cavity 17 is used, the formation of a heterogeneous fuel-air mixture can be prevented.

Since the fuel injection valve 11 is a multi-hole type injector with strong penetration, there is little change in the shape of the fuel stream even when injecting against a high back pressure and a circulating flow can be formed effectively utilizing the flow motion of the fuel stream. As a result, even when exhaust gas is recirculated (EGR) in large quantities, a homogeneous fuel-air mixture can be produced and fuel efficient stratified combustion can be obtained while suppressing the generation of NOx.

In this embodiment, the fuel injection valve 11 is controlled such that it injects fuel toward the outer cavity (first cavity) 17 when the engine is operating under high-load stratified operating conditions and toward the inner cavity (second cavity) 18 when the engine is operating under a low-load stratified operating conditions. As a result, stratified combustion with good fuel efficiency can be obtained regardless of the load because a stratified fuel air mixture (agglomeration) of an appropriate size is generated by controlling the fuel injection timing in accordance with the load in the stratified operating region.

It is also acceptable to control the fuel injection valve 11 such that executes two fuel injections during the compression stroke when the engine is operating under high-load stratified operating conditions, the first fuel injection being directed toward the outer cavity (first cavity) 17 and the second fuel injection being directed toward the inner cavity (second cavity) 18. By executing two fuel injections in this way, a homogeneous stratified fuel-air mixture can be formed inside the entire cavity 16 and stratified combustion can be conducted under high loads with better fuel efficiency.

Since the spark plug 12 is arranged such that the spark discharge gap 12a is positioned on the cylinder center axis C, the combustion can be started from the center of the combustion chamber when a comparatively large stratified fuel-air mixture is formed at the center of the combustion chamber using the outer cavity 17. As a result, a short combustion time can be achieved and, particularly under high-load stratified operating conditions, the cooling losses can be reduced even more effectively.

Second Embodiment

Figure 9:
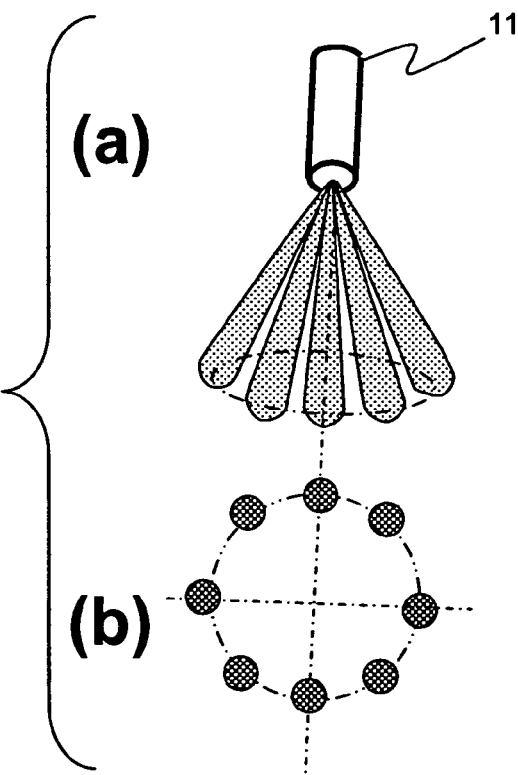
FIG. 9 is a pair diagrammatic illustrations showing the fuel injection stream of a conventional injector that can be used in selected arrangements of the present invention.
Figure 10:
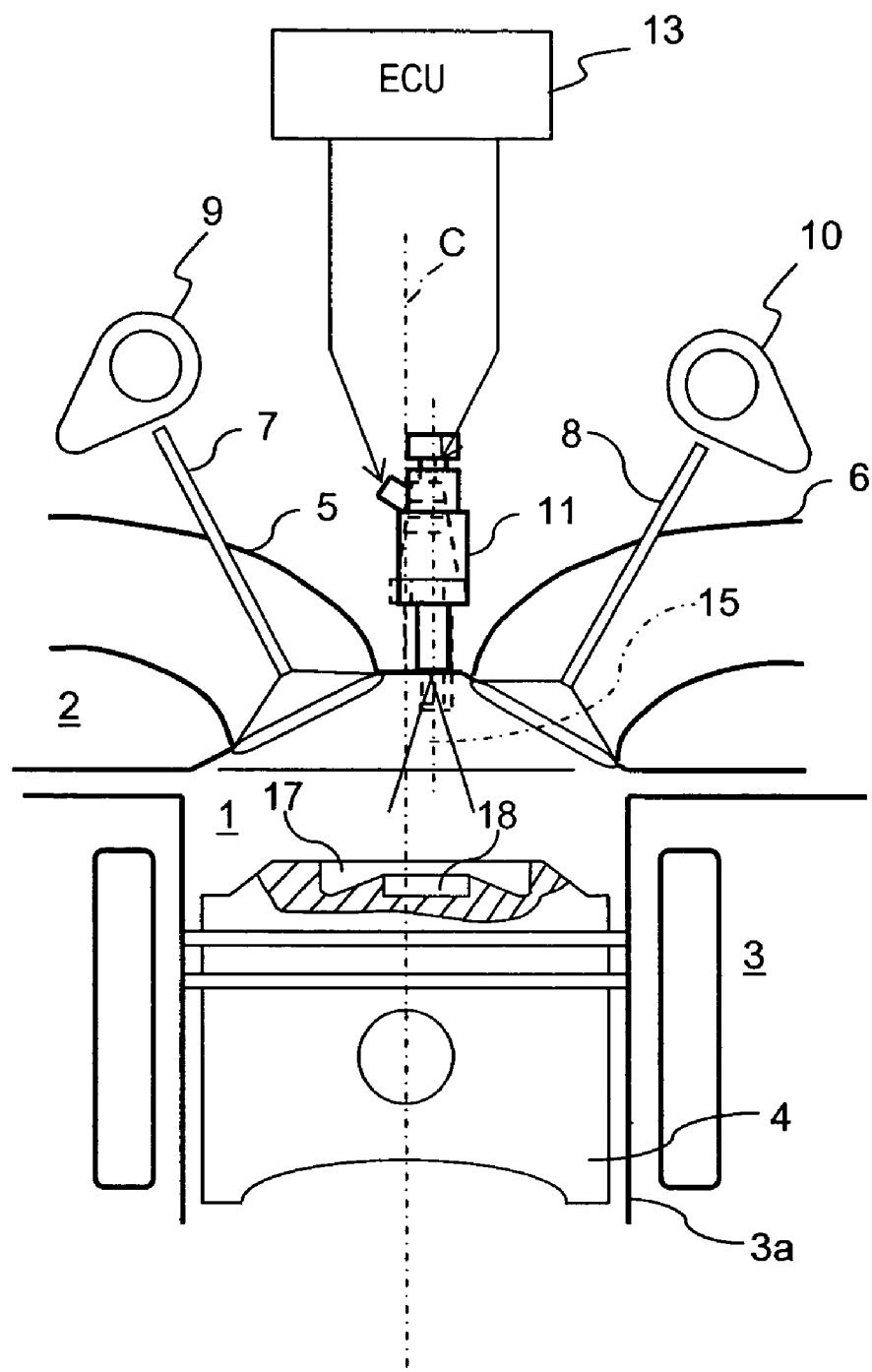
FIG. 10 is a schematic partial cross sectional view of an injection portion of a combustion chamber of a direct fuel injection engine in accordance with a second embodiment of the present invention as viewed in a direction parallel to the piston pin.

Referring initially to FIGS. 9 and 10, a direct fuel injection engine is schematically illustrated in accordance with a second embodiment of the present invention. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In this second embodiment, the positions of fuel injection valve 11 and the outer and inner cavities 17 and 18 have been changed. With this second embodiment of the present invention, the outer and inner cavities 17 and 18 are positioned such that the fuel stream does not spill out when the inner or outer cavity 17 or 18 is used to form a stratified fuel-air mixture. As a result, an appropriate stratified fuel-air mixture can be formed under a wide range of operations.

Thus, the outer cavity 17 and the inner cavity 18 are provided in the top surface of the piston 4 in an overlapping arrangement such that the inner cavity 18 is inside of the outer cavity 17. Each cavity has a cavity center axis that runs parallel to the center reciprocation axis of the piston 4 and intersects the top surface of the piston 4 at a cavity center point 17a and 18a. The outer cavity 17 is arranged such that the cavity center point 17a of the outer cavity 17 passes through the injection center axis 15 of the fuel stream injected from the fuel injection valve 11 when the piston 4 is in a position within the range of fuel injection timings at which a stratified fuel-air mixture is formed chiefly by the outer cavity 17. The inner cavity 18 is arranged such that the cavity center point 18a of the inner cavity 18 passes through the injection center axis 11a of the fuel stream injected from the fuel injection valve 11 when the piston 4 is in a position within the range of fuel injection timings at which a stratified fuel-air mixture is formed chiefly by the inner cavity 18.

Similar to the first embodiment, the fuel injection valve 11 and the spark plug 12 are operatively coupled to an engine control unit 13 such that the operations of the fuel injection valve 11 and the spark plug 12 are controlled by the engine control unit 13. The injection valve 11 preferably produces a generally cone shaped fuel stream with the injection center axis 15 as in the first embodiment. The cone shaped fuel stream of the injection valve 11 can be a complete cone shaped fuel stream (FIG. 8) or a partial cone shaped fuel stream (FIG. 9).

The fuel injection valve 11 is located at the upper surface of the combustion chamber 1 near the center reciprocation axis of the piston 4, but it is slightly offset from the center reciprocation axis of the piston 4 in order to avoid interfering with the spark plug 12. The fuel injection valve 11 is configured and arranged to slant with respect to the center reciprocation axis of the piston 4. The injection center axis 15 of the fuel stream injected from the fuel injection valve 11 is the same as the center axis of the fuel injection valve 11. Thus, the injection center axis 15 is also slanted with respect to the center reciprocation axis of the piston 4.

The top surface of the piston 4 is provided with a cavity 16 that includes a first outer cavity 17 and a second inner cavity 18. The outer cavity 17 has a first cavity center axis that runs parallel to the center reciprocation axis of the piston 4 and intersects the top surface of the piston at a cavity center point 17a. The inner cavity 18 has a second cavity center axis that runs parallel to the center reciprocation axis of the piston 4 and intersects the top surface of the piston at a cavity center point 18a. In this embodiment, the first and second center cavity axes are offset to the exhaust side of the combustion chamber 1, i.e., towards the exhaust ports 6.

Figure 11:
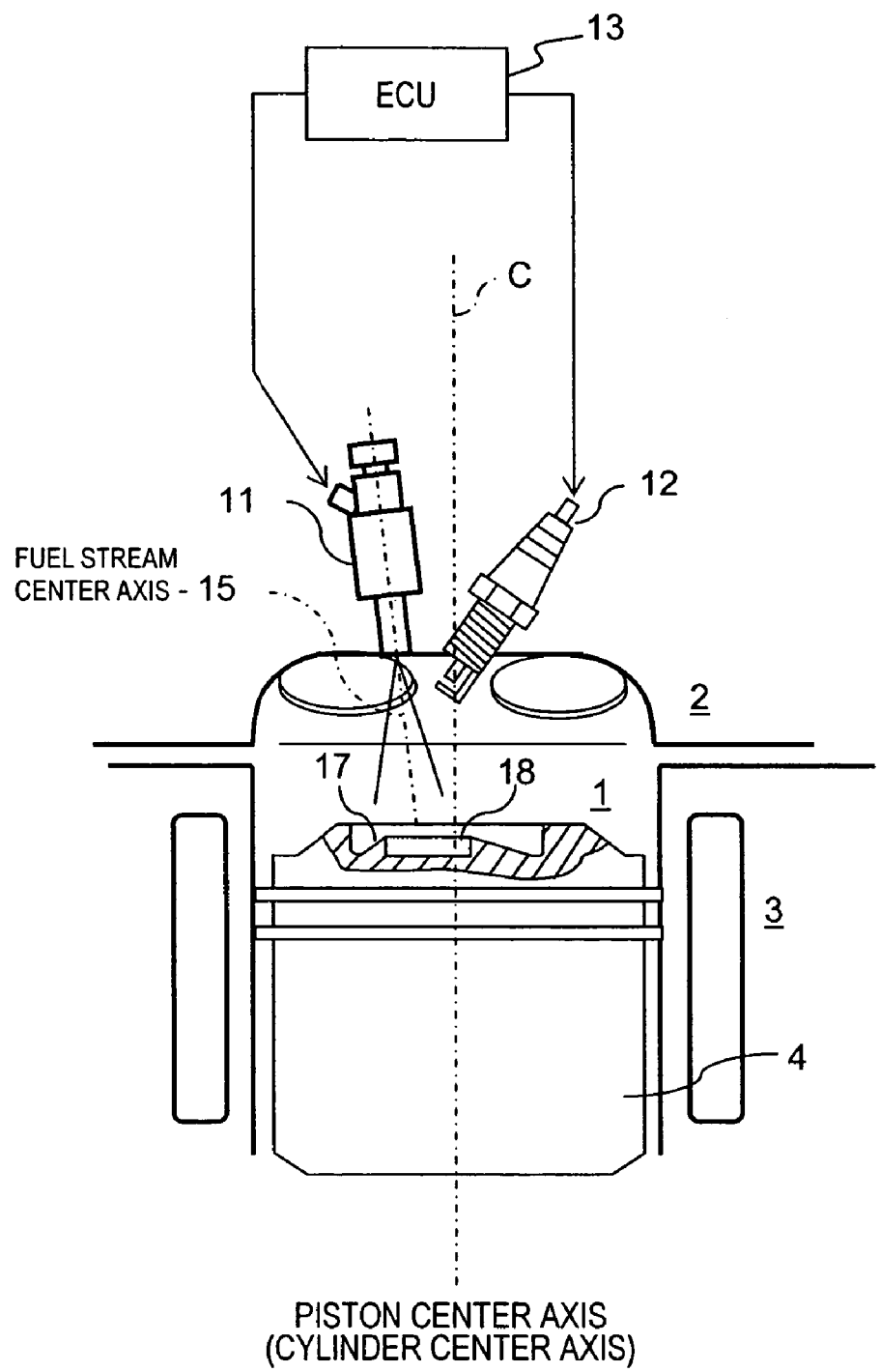
FIG. 11 is a partial cross sectional view of an injection portion of a combustion chamber of a direct fuel injection engine in accordance with the second embodiment of the present invention as viewed in a direction perpendicular to the piston pin.

The outer cavity 17 and the inner cavity 18 are both generally circular in shape but having different diameters, are provided in the top surface of the piston 4 in an overlapping arrangement such that the inner cavity 18 is in the outer cavity 17. When the combustion chamber 1 is viewed from above as shown in FIG. 11, the cavity center points 17a, 18a of the outer cavity 17 and the inner cavity 18, respectively, are arranged such that they lie on the injection center axis 15. The inner cavity center point 18a is closer to the fuel injection valve 11 than the outer cavity center point 17a.

The outer cavity 17 and the inner cavity 18 are arranged to be substantially rotationally symmetrical (axially symmetrical or toroidal) with respect to their center axes. As used herein, the phrase "substantially axially symmetrical" should be interpreted to include minor variations in the surface that do not alter the objectives of the present invention. Thus, the phrase "substantially axially symmetrical" includes a slightly flattened circle, or shapes in which a portion of the surface has been removed. When a stratified charge combustion is conducted in the direct fuel injection internal combustion engine of the present invention, either the outer cavity 17 or the inner cavity 18 is used appropriately to form a fuel-air mixture in the vicinity of the spark plug 12 depending on an engine operating condition. As a result, good fuel efficiency can be obtained and the exhaust of unburned hydrocarbons can be sufficiently suppressed. Moreover, in the present invention, by controlling at least one of frequency and start timings of fuel injection during a cycle, a relatively large stratified fuel-air mixture agglomeration can be obtained when the engine operating conditions are within a prescribed operating region. Thus, the occurrence of a lean fuel-air mixture region in the center of the fuel-air mixture agglomeration (i.e., a donut-shaped fuel-air mixture agglomeration) can be avoided.

Figure 12:
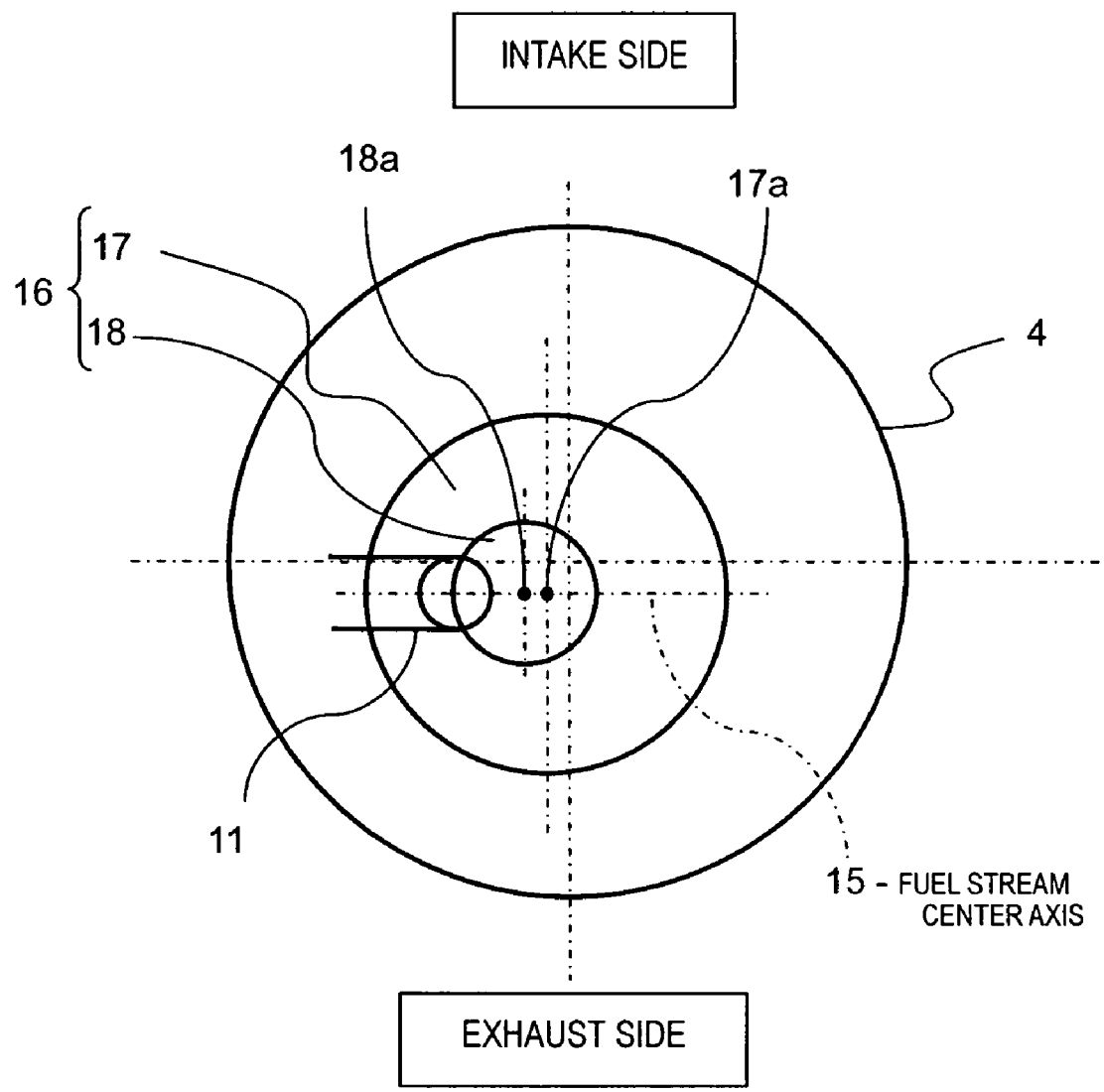
FIG. 12 is a top plan view of the piston illustrating the arrangement of the piston cavities in accordance with the second embodiment of the present invention.
Figure 13:
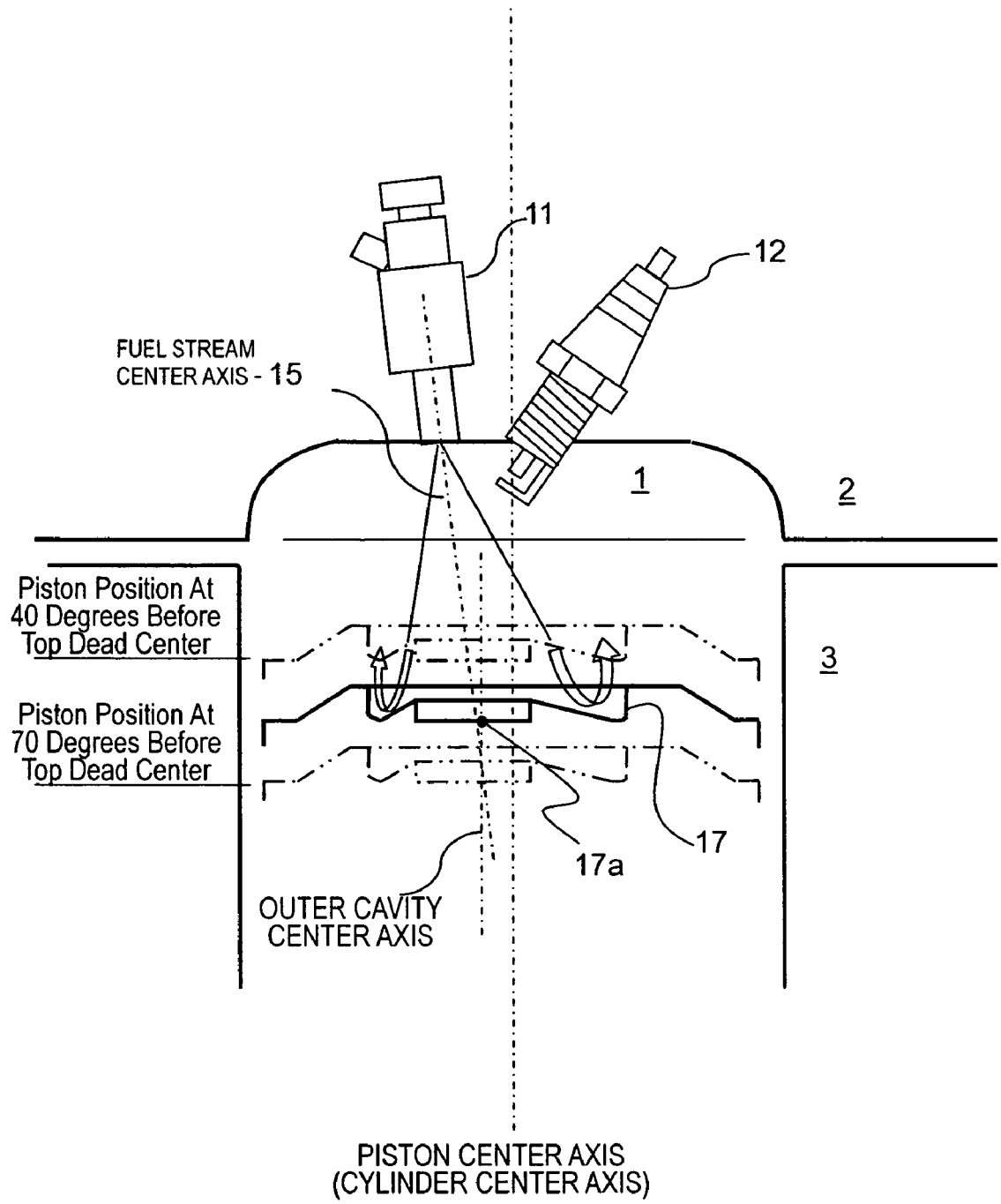
FIG. 13 is a diagrammatic side elevational view of the combustion chamber as viewed in a direction parallel to the piston pin to illustrate cases in which a stratified fuel-air mixture is formed inside the outer cavity in accordance with the second embodiment of the present invention.
Figure 14:
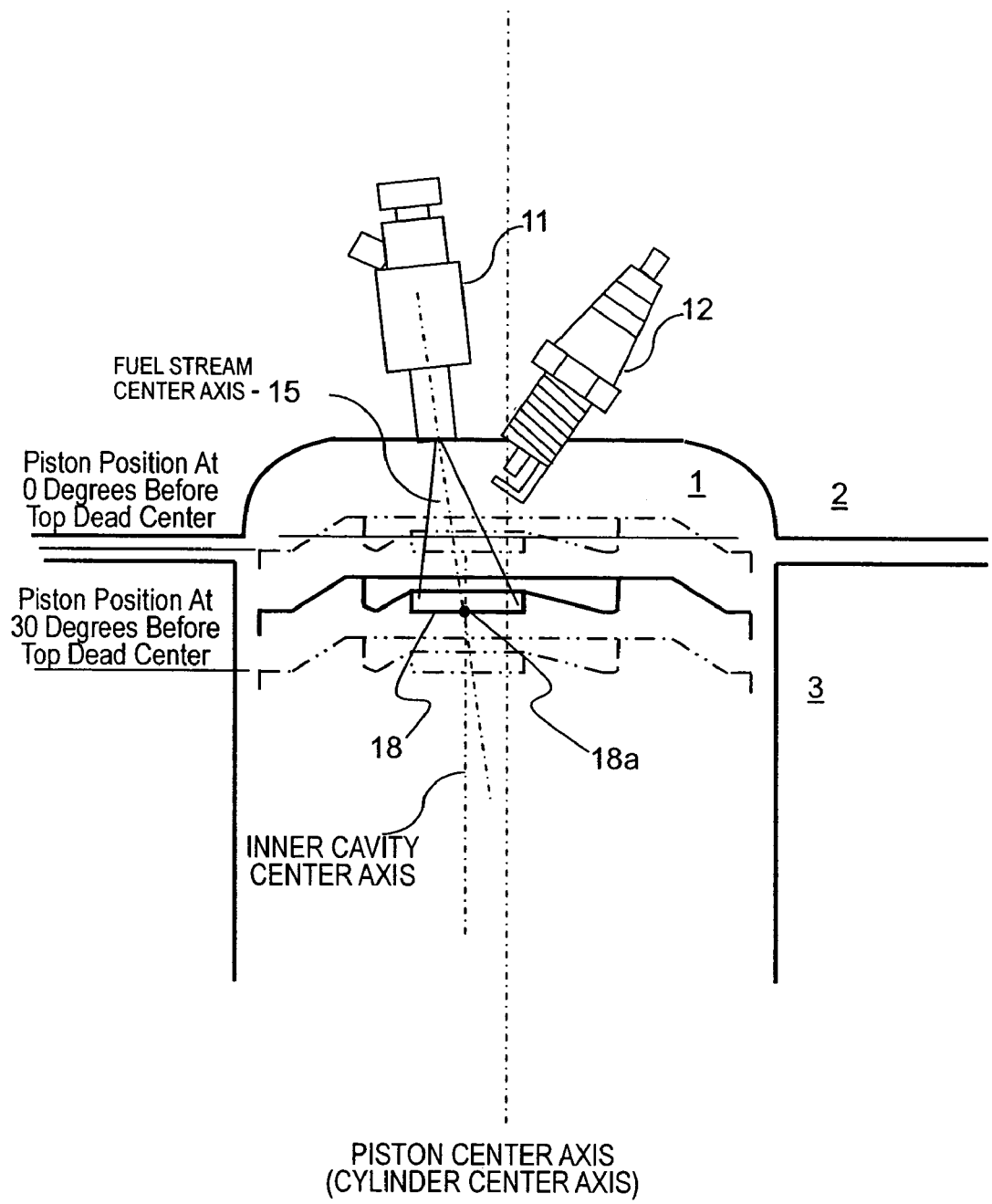
FIG. 14 is a diagrammatic side elevational view of the combustion chamber as viewed in a direction parallel to the piston pin to illustrate cases in which a stratified fuel-air mixture is formed inside the inner cavity in accordance with the second embodiment of the present invention.

The positions of the cavity center points 17a and 18a will now be explained in more detail. As shown in the side view of the combustion chamber 1 illustrated in FIG. 12, the outer cavity center point 17a is arranged such that the outer cavity center point 17a substantially passes through the injection center axis 15 when the piston 4 is between 40 degrees and 70 degrees before top dead center during a compression stroke. The range of 40 to 70 degrees before top dead center corresponds to the fuel injection timing used when the stratified fuel-air mixture is to be formed mainly using the outer cavity 17. Meanwhile, as shown in FIG. 13, the inner cavity center point 18a is arranged such that the inner cavity center point 18a substantially passes through the injection center axis 15 when the piston is between 0 degrees and 30 degrees before top dead center during a compression stroke. The range of 0 to 30 degrees before top dead center corresponds to the fuel injection timing used when the stratified fuel-air mixture is to be formed mainly using the inner cavity 18.

Thus, when the operating conditions are such that the fuel stream is injected comparatively early, i.e., in the range from 40 to 70 degrees before top dead center, so as to form a stratified fuel-air mixture using chiefly the outer cavity 17, a fuel stream that spreads generally axially-symmetrically around the injection center axis 15 can form a comparatively large stratified fuel-air mixture that circulates within the outer cavity 17 because the cavity center point 17a of the outer cavity 17 passes through the injection center axis 15 when the piston is between 40 degrees and 70 degrees before top dead center. Furthermore, spilling of the fuel stream from the outer cavity 17 under such operating conditions is reduced.

Similarly, when the operating conditions are such that the fuel stream is injected comparatively late, i.e., in the range from 0 to 30 degrees before top dead center, so as to form a stratified fuel-air mixture mainly using the inner cavity 18, a fuel stream that spreads generally axially-symmetrically around the injection center axis 15 can form a small stratified fuel-air mixture inside or above the inner cavity 18 because the cavity center point 18a of the inner cavity 18 passes through the injection center axis 15 when the piston is between 0 degrees and 30 degrees before top dead center. Furthermore, spilling of the fuel stream from the inner cavity 18 under such operating conditions is reduced.

With this embodiment, an appropriate stratified fuel-air mixture can be formed under a wide range of stratified operating conditions and the fuel efficiency of the engine is improved. Additionally, since the spillage of fuel from the cavities can be reduced, the amount of unburned hydrocarbons emitted from the engine can be greatly reduced.

Although the embodiment described above illustrates a case in which the fuel injection valve 11 is not tilted toward the intake valve or the exhaust valve, the same effects can be obtained in a case in which the fuel injection valve 11 is tilted toward the intake valve or exhaust valve so long as the center points of the outer cavity and the inner cavity are arranged in accordance with the present invention with respect to the injection center axis.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to each of the following Japanese Patent Application Nos. 2003-376575 and 2003-

377166. The entire disclosures of Japanese Patent Application Nos. 2003-376575 and 2003-377166 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A direct fuel injection engine comprising:
a combustion chamber;
a piston disposed in the combustion chamber to move along a cylinder center axis, the piston including a top surface having a first outer cavity having a first cavity center axis, and a second inner cavity located entirely in the outer cavity in a top plan view and having a second cavity center axis offset from the cylinder center axis of the piston in a direction perpendicular to the cylinder center axis;
a spark plug having a tip arranged in an upper area of the combustion chamber to ignite a fuel-air mixture inside the combustion chamber; and
a fuel injection valve arranged in the upper area of the combustion chamber to inject a fuel stream directly into the combustion chamber towards the outer and inner cavities in the top surface of the piston, the fuel stream having an injection center axis that is slanted relative to the cylinder center axis.

2. A direct fuel injection internal combustion engine comprising:
means for forming a combustion chamber having a piston movably mounted therein along a cylinder center axis, the piston including a top surface having a first outer cavity having a first cavity center axis, and a second inner cavity located entirely in the outer cavity in a top plan view and having a second cavity center axis offset from the cylinder;
igniting means for igniting a fuel-air mixture in the combustion chamber;
injection means for injecting a fuel stream directly into the combustion chamber towards the outer and inner cavities in the top surface of the piston such that the fuel stream has an injection center axis that is slanted relative to the cylinder center axis.

3. A method of operating a direct fuel injection internal combustion engine comprising:
reciprocating a piston in a cylinder, including a top surface having a first outer cavity having a first cavity center axis, and a second inner cavity located entirely in the outer cavity in a top plan view and having a second cavity center axis offset from the cylinder;
selectively injecting a fuel stream directly into the combustion chamber towards the outer and inner cavities in the top surface of the piston such that the fuel stream has an injection center axis that is slanted relative to the cylinder center axis; and
igniting a stratified fuel-air mixture formed above at least one of the inner and outer cavities.

4. A direct fuel injection engine comprising:
a combustion chamber;
a piston disposed in the combustion chamber to move along a cylinder center axis, the piston including a top surface having a first outer cavity having a first cavity center axis, and a second inner cavity located in the outer cavity and having a second cavity center axis offset from the cylinder center axis of the piston in a direction perpendicular to the cylinder center axis;
a spark plug having a tip arranged in an upper area of the combustion chamber to ignite a fuel-air mixture inside the combustion chamber; and
a fuel injection valve arranged in the upper area of the combustion chamber to inject a fuel stream directly into the combustion chamber towards the outer and inner cavities in the top surface of the piston, the fuel stream having an injection center axis that is slanted relative to the cylinder center axis,
the first and second center cavity axes of the outer and inner cavities being offset from the cylinder center axis toward where the injection center axis of the fuel stream injected from the fuel injection valve at a time of fuel injection, and
the fuel injection valve including a fuel injection point being arranged closer to the second cavity center axis of the inner cavity than to the first cavity center axis of the outer cavity as measured perpendicular to the first and second center cavity axes of the outer and inner cavities.

5. The direct fuel injection engine recited in claim 4, wherein
at least the second cavity center axis of the inner cavity is positioned generally on the injection center axis of the fuel stream injected from the fuel injection valve at the time of fuel injection.

6. The direct fuel injection engine recited in claim 5, wherein
the first and second center cavity axes of the outer and inner cavities are both generally positioned on the injection center axis of the fuel stream injected from the fuel injection valve at the time of fuel injection.

7. The direct fuel injection engine recited in claim 4, wherein
the outer cavity has a center point on the top surface of the piston that is generally positioned on the injection center axis of the fuel stream injected from the fuel injection valve at the time of fuel injection, when the piston is in a position within a first range of fuel injection timings at which a stratified fuel-air mixture is formed by the outer cavity; and
the inner cavity has a center point on the top surface of the piston that is generally positioned on the injection center axis of the fuel stream injected from the fuel injection valve at the time of fuel injection, when the piston is in a position within a second range of fuel injection timings at which a stratified fuel-air mixture is formed by the inner cavity.

8. The direct fuel injection engine recited in claim 7, wherein
the first range of fuel injection timings at which the stratified fuel air mixture is formed by the outer cavity occurs at crank angles from 40 to 70 degrees before top dead center of a compression stroke; and
the second range of fuel injection timings at which the stratified fuel-air mixture is formed by the inner cavity occurs at crank angles from 0 to 30 degrees before top dead center of the compression stroke.

9. A direct fuel injection engine comprising:
a combustion chamber:
a piston disposed in the combustion chamber to move along a cylinder center axis, the piston including a top surface having a first outer cavity having a first cavity center axis, and a second inner cavity located in the outer cavity and having a second cavity center axis offset from the cylinder center axis of the piston in a direction perpendicular to the cylinder center axis;
a spark plug having a tip arranged in an upper area of the combustion chamber to ignite a fuel-air mixture inside the combustion chamber; and
a fuel injection valve arranged in the upper area of the combustion chamber to inject a fuel stream directly into the combustion chamber towards the outer and inner cavities in the top surface of the piston, the fuel stream having an injection center axis that is slanted relative to the cylinder center axis,
the outer cavity being generally circular in a top plan view with the first cavity center axis positioned approximately on the cylinder center axis, and
the inner cavity being generally circular in a top plan view with the second cavity center axis positioned in a different location than the first cavity center axis.

10. The direct fuel injection internal combustion engine recited in claim 9, wherein
the fuel injection valve includes a plurality of fuel injection points that are arranged such that the fuel injection valve does not inject fuel to at a location where the distance from a peripheral wall of the outer cavity to the inner cavity is the shortest.

11. The direct fuel injection engine recited in claim 9, further comprising
a controller configured to inject fuel from the fuel injection valve toward the outer cavity when operating under stratified combustion conditions and a high load, and to inject fuel toward the inner cavity when operating under stratified combustion conditions and a low load.

12. The direct fuel injection engine recited in claim 9, further comprising
a controller configured to perform two fuel injections from the fuel injection valve during a compression stroke when operating under stratified combustion conditions and a high load, with a first fuel injection being directed toward the outer cavity and a second fuel injection being directed toward the inner cavity.

13. The direct fuel injection engine recited in claim 9, wherein
the spark plug includes a spark discharge gap on the tip that is positioned on the cylinder center axis.

14. The direct fuel injection engine recited in claim 9, wherein
the fuel injection valve includes a fuel injection tip end being offset from the cylinder center axis and lies on the injection center axis; and
the second cavity center axis of the inner cavity is positioned closer to the fuel injection tip end than the cylinder center axis.

15. The direct fuel injection engine recited in claim 14, wherein
the inner cavity has a center point on the top surface of the piston that is generally positioned on the injection valve mounting axis of the fuel injection valve at the time of fuel injection, when the piston is near top dead center.

* * * * *